Nov. 23, 1971   S. P. J. ELLIS   3,621,583
JACK LEVEL INDICATOR

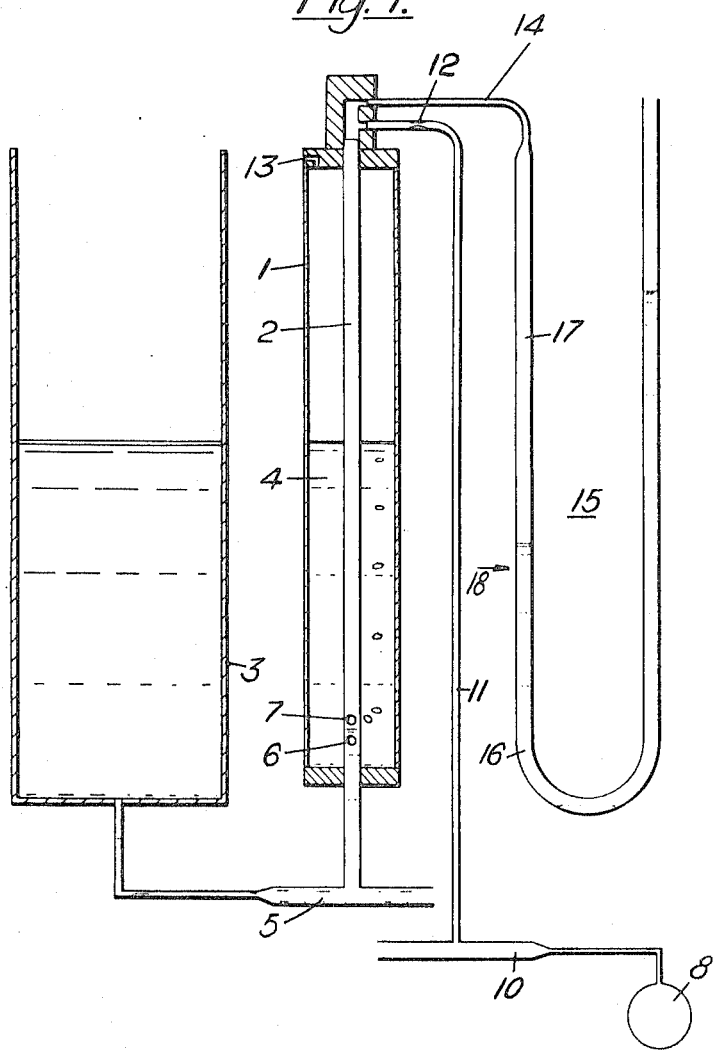

Filed April 25, 1969   4 Sheets-Sheet 4

United States Patent Office 3,621,583
Patented Nov. 23, 1971

3,621,583
JACK LEVEL INDICATOR
Stanley Peter John Ellis, London, England, assignor to John Laing and Son Limited, London, England
Filed Apr. 25, 1969, Ser. No. 819,153
Claims priority, application Great Britain, Apr. 29, 1968, 20,188/68
Int. Cl. G01c 5/04
U.S. Cl. 33—209
2 Claims

ABSTRACT OF THE DISCLOSURE

The invention relates to a method and apparatus for determining the levels of a plurality of work-pieces. A container is placed on each work-piece and connected to a source of liquid of which an amount, depending on the level of the container, enters the container. A tube extends into the container and is open to the liquid. A fluid forces liquid out of the tube and bubbles through the liquid. The back pressure on the fluid depends on the amount of liquid in the container, and this pressure is measured.

---

This invention relates to a method and an apparatus which may be used in levelling a plurality of work-pieces.

It is known to employ a tube having sight glasses at each end and containing a liquid which may be positioned so that the level of the liquid with respect to markings on the sight glasses can be used to indicate a common level at widely spaced positions. The present invention has particular, though not exclusive, application in the construction industry in indicating continuously and at a central location, the levels of a plurality of work-pieces, for example form work or shuttering, which is moved by means of jacks as the construction of a building progresses.

According to one aspect of the present invention there is provided a method of determining the levels of a plurality of work-pieces such method including the steps of supplying liquid at a constant head to a container on each work-piece, and measuring the height of liquid in each container by determining the back pressure on a stream of fluid passed into the liquid at a particular location in each container.

According to another aspect of the invention there is provided apparatus for use in determining the levels of a plurality of work-pieces including a plurality of containers, each connected to a common source of liquid, a coupling tube extending into the liquid in each container so that the interior of each tube is in communication with liquid in the container, an outlet adjacent the top of each container, a plurality of pressure indicator gauges, and a fluid connection between each coupling tube and a respective pressure indicator gauge, and means for supplying fluid to the connections between the coupling tubes and the pressure indicator gauges.

In order that the invention may be more clearly understood, the following description is given by way of example with reference to the accompanying drawings, in which:

FIG. 1 shows a section of one embodiment of apparatus according to the invention and illustrates the principle of the invention;

Figure 1A:
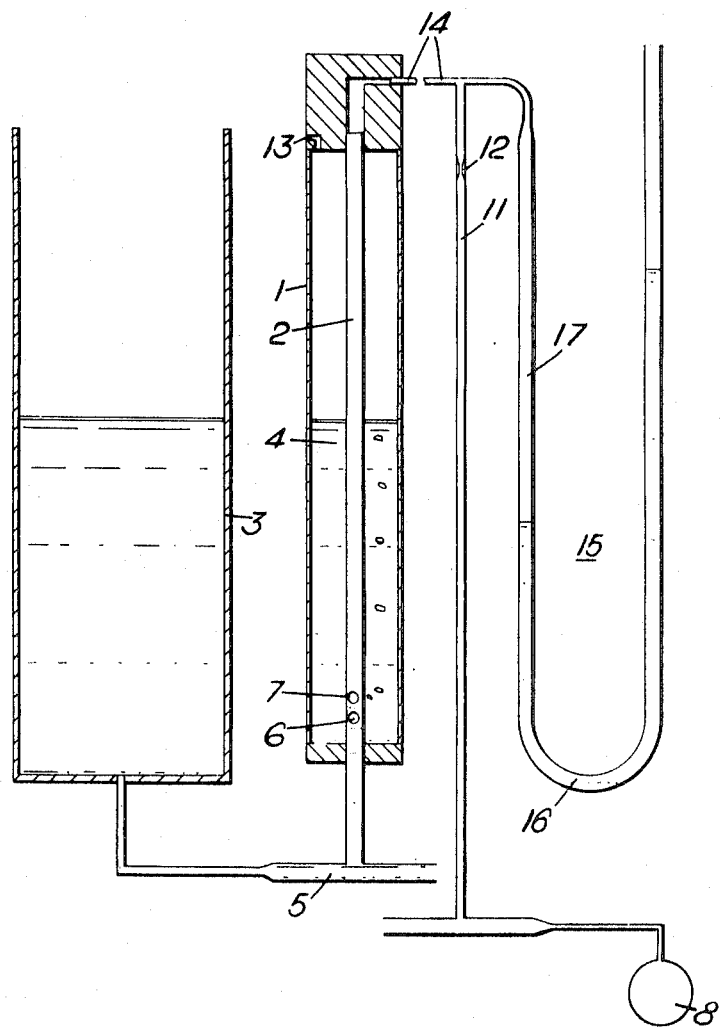
FIG. 1A shows a second embodiment of apparatus according to the invention.

Referring to FIG. 1 there is shown a container 1 including a central tube 2 which has two holes 6 and 7 near to the lower end of the container 1. The space between the container 1 and the tube 2 contains a liquid 4 which may conveniently be water, mixed, where necessary, with an anti-freeze solution. The liquid 4 is supplied at a constant pressure from a ring main 5 to the container 1 via an extension of the tube 2 and the hole 6 in the tube. The ring main 5 is connected to a centrally placed reservoir 3 which is filled to a predetermined level with the liquid in order to ensure that the pressure of the liquid is substantially constant throughout the ring main, and a plurality of similar containers are supplied from the reservoir.

The upper end of the tube 2 is connected with a source of gas which is supplied from a supply pipe 10 via a connector pipe 11 having a restrictor 12. A gas supply 8 is provided which may be a compressor, or a cylinder or pressurised gas. The gas passes along the tube 2, it forces liquid down to the level of hole 7, passes through hole 7 and bubbles slowly through the liquid 4 in the container before escaping through a vent 13 at the top of the container 1.

In one modification there is a single hole in place of the two holes 6 and 7 and the level of the water in the tube 2 varies about the level of the single hole as gas passes into the liquid. In yet a further modification there is a diaphragm between the two holes 6 and 7.

It is not essential for the tube 2 to be continuous in the way shown. There can be two tubes, one for the gas with the hole 7 near its end, and one for passing the liquid into the container.

The container 1 is made of a transparent material, for example toughened glass, and one assembly including a container 1 is mounted upon each work-piece to be levelled. It is not essential for the container 1 to be made of transparent material, though in practice it is convenient to be able to check the operation of the device. The connections to the container 1 from the ring main 5 and the gas supply 10 are flexible so that the container may move relatively to them.

A flexible connection from the container is also made via a pipe 14 to a remotely located U-tube manometer 15 containing a liquid 16.

In operation gas is supplied to the tube 2 and the pipe 14 from the supply 10 via a restrictor 12. The pressure of the gas in supply pipe 10 is at least equal to that required to support a column of liquid 4 which extends to the top of the container 1. The restrictor 12 ensures that the flow of gas into the tube 2 is so related to the rate at which it can escape through the hole 7 that no back pressure is caused in the tube 2 by the hole 7 acting as a restriction. The back pressure in tube 2 is thus due substantially only to the height of the column of liquid 4 above the hole 7, this height being governed by the level of the container relative to the reservoir. If the container 1 is raised so that the level of the liquid 4 falls with respect to a datum on the container the weight of the liquid 4 which is to be supported at the hole 7 by the gas is reduced. The gas pressure in tubes 2 and 14 falls in proportion to the change in liquid level, and the difference between the levels of the liquid in the two arms of the U-tube manometer 15 is also reduced by an amount corresponding to this fall in the liquid level. The change in level of the liquid in each arm of the U-tube manometer 15 is half the change in the difference in level between the two arms, and it is possible to calibrate one arm so that change in the level of the container 1 can be read directly from the change in height of the liquid 16 in the one arm of the U-tube manometer. In practice, the arm 17 of the U-tube manometer 15 is viewed in the direction of the arrow 18 and a number of such manometers are arranged side by side so that variations in the level indicated by each of them may be easily compared.

FIG. 1A shows an embodiment differing from that in FIG. 1 in that the application point of the fluid supply is in a part of the pipe 14 near the manometer 15. This means that the pressure indicated by the manometer is equal to the head of liquid in the container 1 plus pressure drop in the pipe 14. All pipes 14 should be of the same dimensions to obviate variations in the pressure drop, and thus provide the advantage that pipework is reduced.

Figure 2:
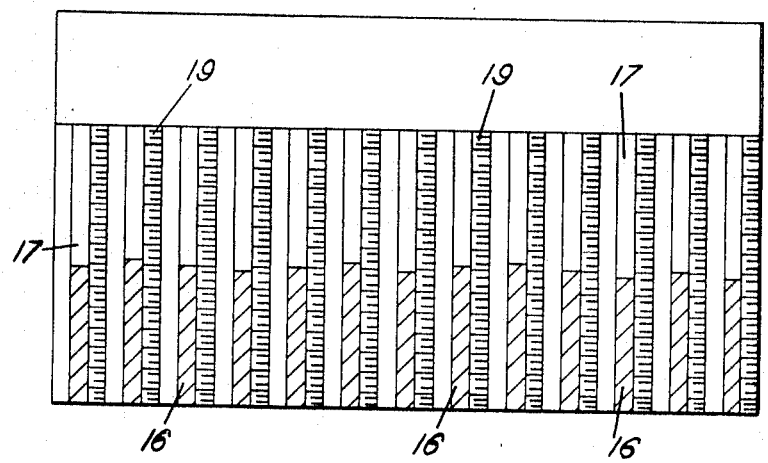
FIG. 2 shows the front elevation of a central indicating unit for use in the invention.

Referring to FIG. 2 there is shown the front elevation of a unit containing a number of U-tube manometers arranged side by side so that each of the arms 17 containing liquid 16 is easily visible. A scale 19 is arranged adjacent each manometer so that the readings may be read more accurately. Each of the tubes 17 is viewed in the direction of the arrow 18 in FIG. 1.

Figure 3:
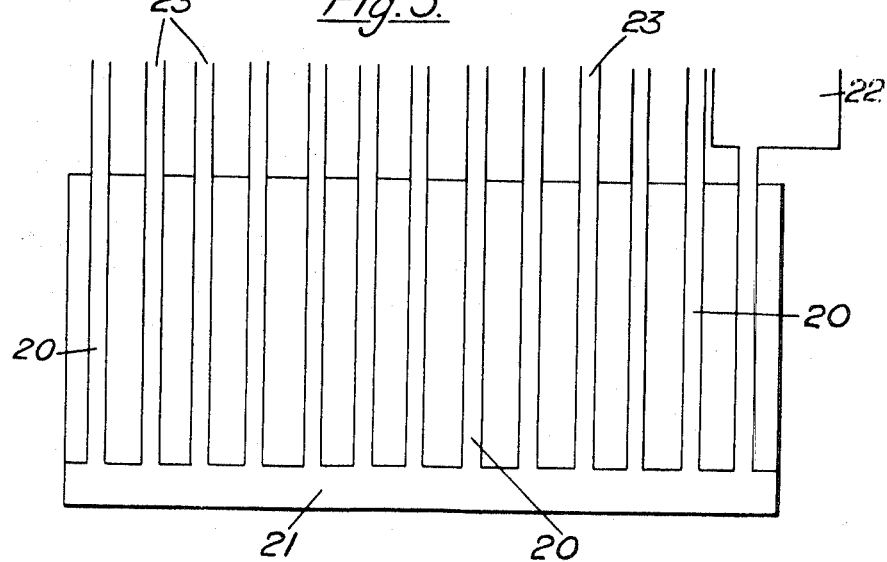
FIG. 3 shows diagrammatically an alternative central indicating unit.

In order to avoid the complication resulting from the use of a plurality of U-tubes arranged side by side, it is possible, as may be seen from FIG. 3, to arrange indicator tubes 20 extending from a common tube 21 which is supplied with liquid from a reservoir 22. The ends 23 of each of the tubes 20 are connected to the tubes 14 of respective indicator assemblies including containers 1 and tubes 2. By means of this arrangement it is possible for the pressure exerted by the gas in the respective tubes 14 to cause the level of the liquid in each of the tubes 20 to respond to changes in pressure of the gas in the tubes 2 due to movement of the indicator assemblies. This movement of the liquid in the tubes 20 is in direct relationship to the relative movement of the liquid 4 in the containers 1 and there is no need to scale the movement down in order to obtain a reading.

In certain circumstances however it may be advantageous to use the arrangement in which the reading is scaled down since the scaled down readings give a better overall impression of the relative positions of the workpieces and their total possible movement.

Although, in general, it would be more convenient to use air as the gas in the supply pipe 10 any other source of gas under pressure, for example nitrogen may be used. As has been mentioned, water is satisfactory as the liquid in the ring main 5, but there is the possibility of loss due to evaporation and it is necessary to ensure that, where the pressure is obtained from a head of water in a central reservoir, this head be maintained. However since the error is common to all of the indicators used the relative indications of the work-piece positions will not be affected.

Figure 4:
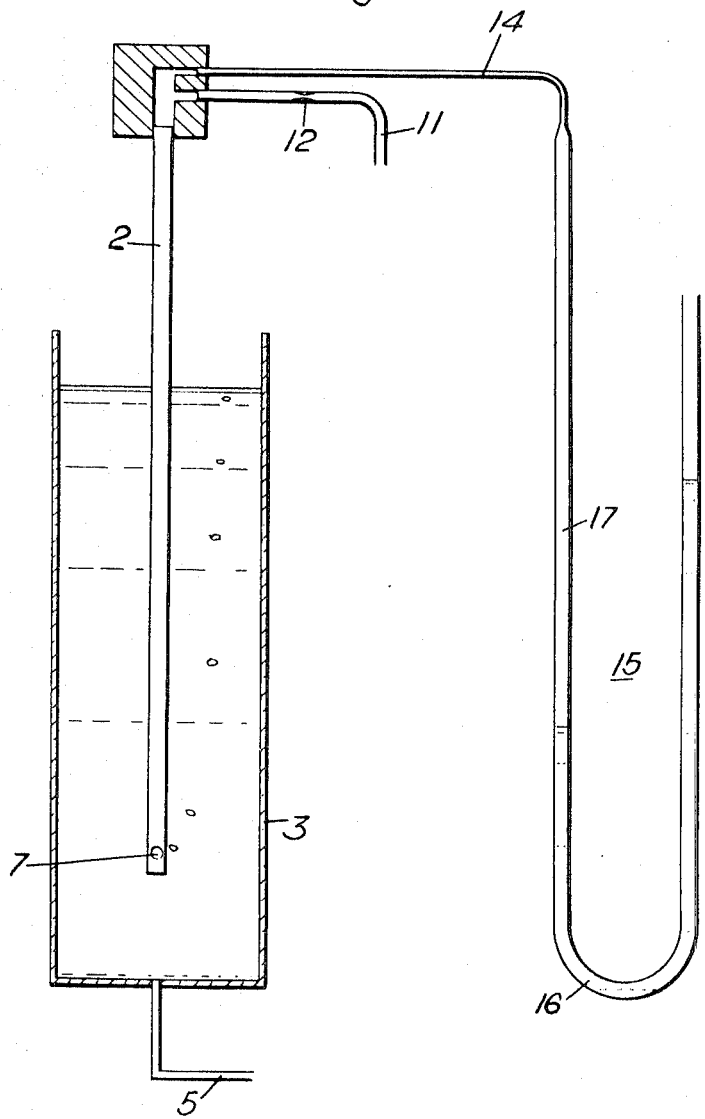
FIG. 4 shows one embodiment of apparatus for determining the height of the liquid source.

Alternatively one of the tubes 17 in FIG. 2 or 20 in FIG. 3 can be used to give the level of the liquid in the reservoir supplying the containers by the said means as used in the containers. This is illustrated in FIG. 4 where the U-tube manometer measures the back pressure caused by the liquid in the reservoir above the hole 7. This gives a datum relative to which the levels of individual containers can be measured and counteracts loss of liquid due to evaporation. A calibrated screen may be provided which is adjustable to give a zero reading to the tube recording the level of liquid in the reservoir.

The invention has particular application in building construction work where concrete sections are formed by sliding shuttering in the direction in which the structure is being built by means of jacks. Structures to which this form of construction is particularly applicable are circular towers, chimneys or the service cores of multi-storey buildings. With such structures it is essential that the construction be maintained vertical and free from twist and the present invention provides an arrangement by means of which the correct positioning of the sliding form work or shuttering may be easily and continuously monitored.

Any known type of pressure gauge may be used in place of the U-tube manometer type described.

I claim:

1. Apparatus for use in determining the difference in levels of a plurality of pieces of shuttering, said apparatus comprising in combination:
   a plurality of containers;
   a top and a bottom to each said container;
   a source of liquid;
   a plurality of straight coupling tubes, each coupling tube extending into one of said containers and through said bottom thereof and having a lower end below said bottom;
   connecting means connecting said source of liquid to each said coupling tube at said lower end;
   means defining two holes in each said coupling tube at different levels within the containers;
   a plurality of U-tube manometers, said manometers being arranged side by side in a bank;
   a plurality of fluid connections each connecting one of said coupling tubes with one of said manometers;
   a supply of fluid under pressure;
   means for introducing said fluid into each of said fluid connections; and
   an outlet adjacent the top of each of said containers.

2. Apparatus as specified in claim 1 wherein said fluid supply means are connected to said fluid connections at points adjacent said pressure indicator gauges.

References Cited

UNITED STATES PATENTS

| | | | |
|---|---|---|---|
| 2,532,883 | 12/1950 | Bennett | 33—209 |
| 2,791,119 | 5/1957 | Zinn | 73—302 X |
| 3,262,313 | 7/1966 | Hanna | 73—302 |
| 3,424,003 | 1/1969 | Rausch | 73—302 |
| 3,475,959 | 11/1969 | Glassey | 73—302 X |
| 2,659,157 | 11/1953 | Aller | 33—178 Air Digest |

FOREIGN PATENTS

| | | | |
|---|---|---|---|
| 292,738 | 1916 | Germany | 33—209 |

LEONARD FORMAN, Primary Examiner

D. A. DEARING, Assistant Examiner